United States Patent
Oh et al.

(10) Patent No.: US 12,533,873 B2
(45) Date of Patent: Jan. 27, 2026

(54) DEVICE AND METHOD FOR SEPARATING WAFERS

(71) Applicant: SK SILTRON CO., LTD., Gumi-si (KR)

(72) Inventors: Se Ah Oh, Gumi-si (KR); Je Hyung Seo, Gumi-si (KR); Kee Yun Han, Gumi-si (KR)

(73) Assignee: SK SILTRON CO., LTD., Gyeongsangbuk-Do (KR)

( * ) Notice: Subject to any disclaimer, the term of this patent is extended or adjusted under 35 U.S.C. 154(b) by 82 days.

(21) Appl. No.: 18/244,444

(22) Filed: Sep. 11, 2023

(65) Prior Publication Data
US 2024/0326401 A1    Oct. 3, 2024

(30) Foreign Application Priority Data
Mar. 29, 2023   (KR) .................. 10-2023-0041220

(51) Int. Cl.
B32B 43/00      (2006.01)
(52) U.S. Cl.
CPC .................................. B32B 43/006 (2013.01)
(58) Field of Classification Search
CPC ............ B32B 43/006; H01L 21/67092; H01L 21/67098; H01L 21/67259; H01L 21/67742; B28D 5/00; B28D 5/007; B28D 5/0082
See application file for complete search history.

(56) References Cited

U.S. PATENT DOCUMENTS 10,192,794 B2 *   1/2019  Kim .......................... B08B 3/04

FOREIGN PATENT DOCUMENTS

| KR | 10-2011-0053573 |   | 5/2011 |
| KR | 10-2012-0086873 |   | 8/2012 |
| KR |     2012086873 A | * | 8/2012 |
| KR |     2022138599 A | * | 10/2022 |

OTHER PUBLICATIONS

The Transformer, "DIY Welding Magnet" Mar. 11, 2021. YouTube Video accessed at <https://www.youtube.com/watch?v=3VpdKA5kPtw> (Year: 2021).*

* cited by examiner

*Primary Examiner* — Alex B Efta
*Assistant Examiner* — Alexander S Wright
(74) *Attorney, Agent, or Firm* — KED & ASSOCIATES

(57) ABSTRACT

Disclosed is a device for separating wafers sheet by sheet from ingot blocks having a plurality of sliced wafers bonded thereto. The wafer separation device includes a water tank configured to receive the ingot blocks and a liquid, a heating member configured to heat the liquid, a barrier rib provided in the water tank to isolate the ingot blocks from each other, an arm configured to separate the wafers sheet by sheet from the ingot blocks, and a sensor configured to sense the barrier rib.

17 Claims, 7 Drawing Sheets

[FIG. 1]
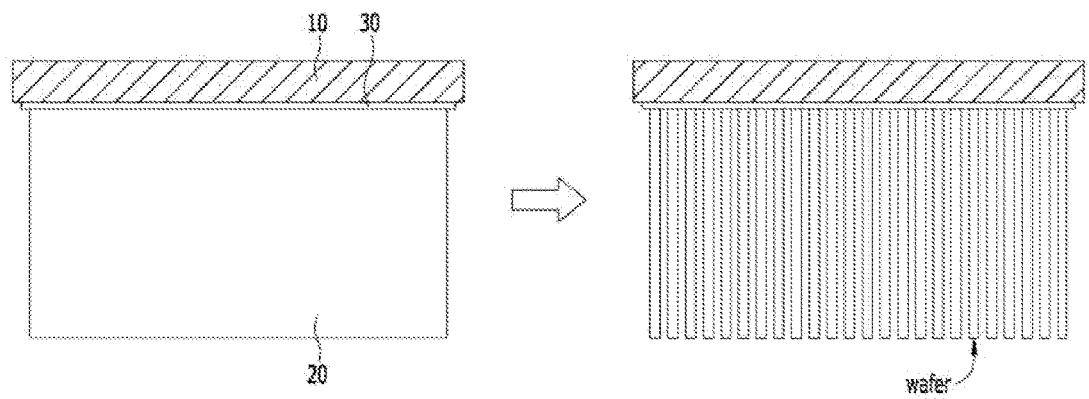
[FIG. 2]
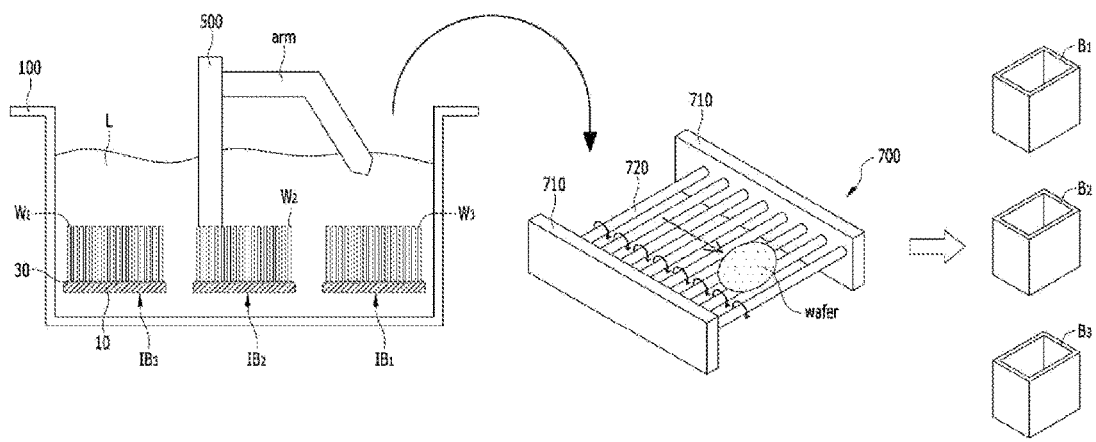

【FIG. 3】
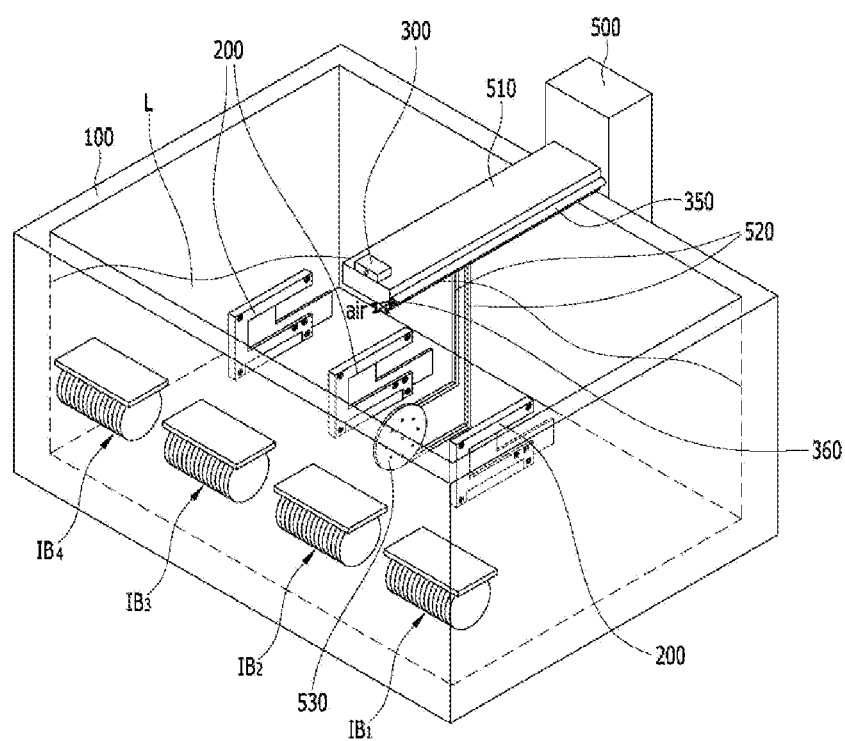

【FIG. 4A】
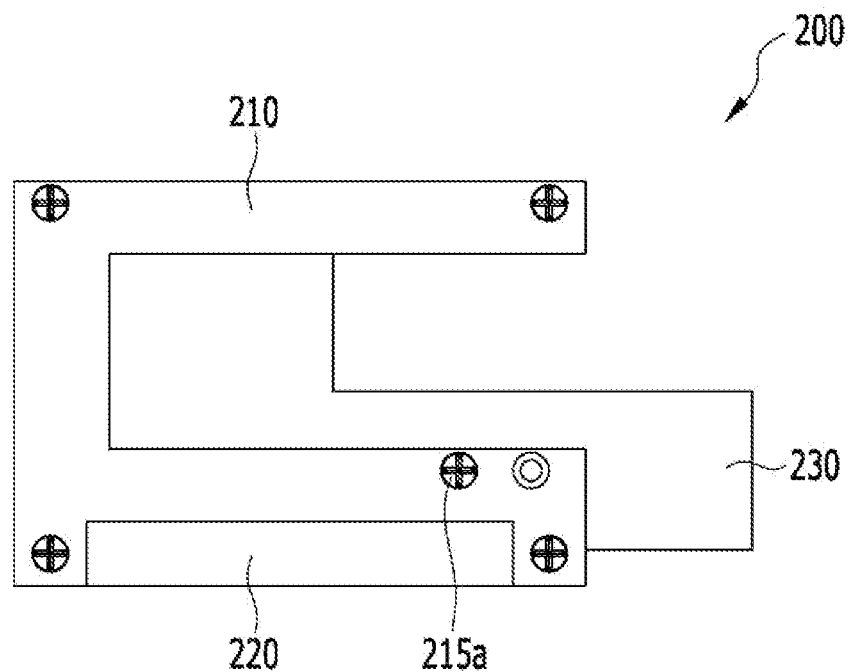
【FIG. 4B】
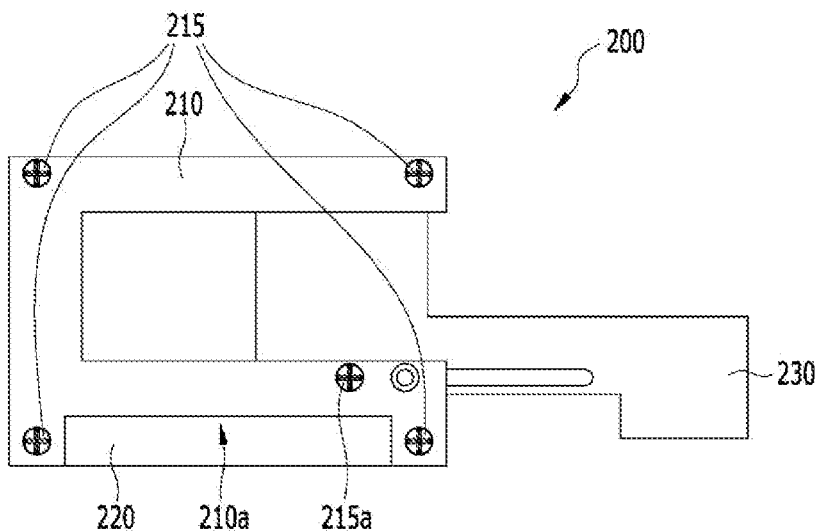

【FIG. 5A】
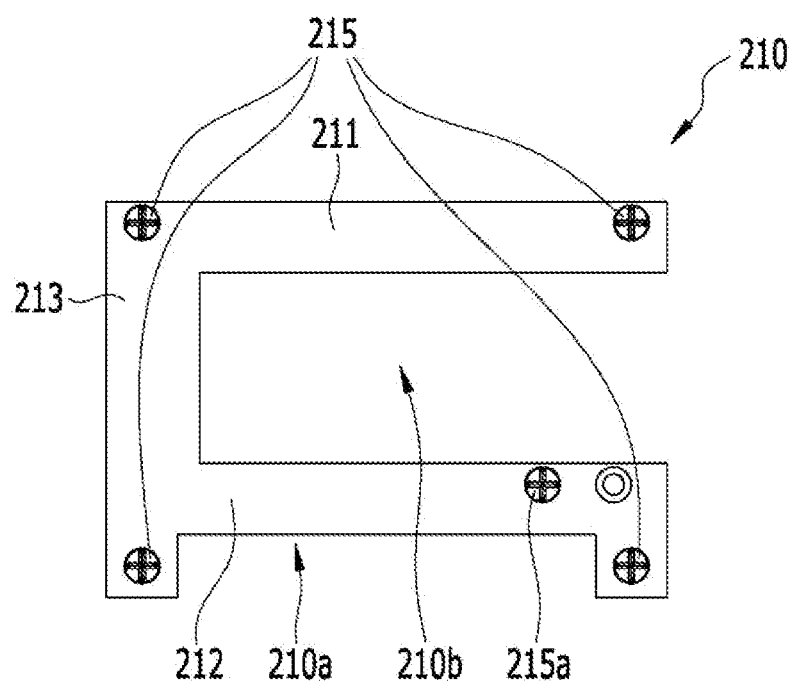

【FIG. 5B】
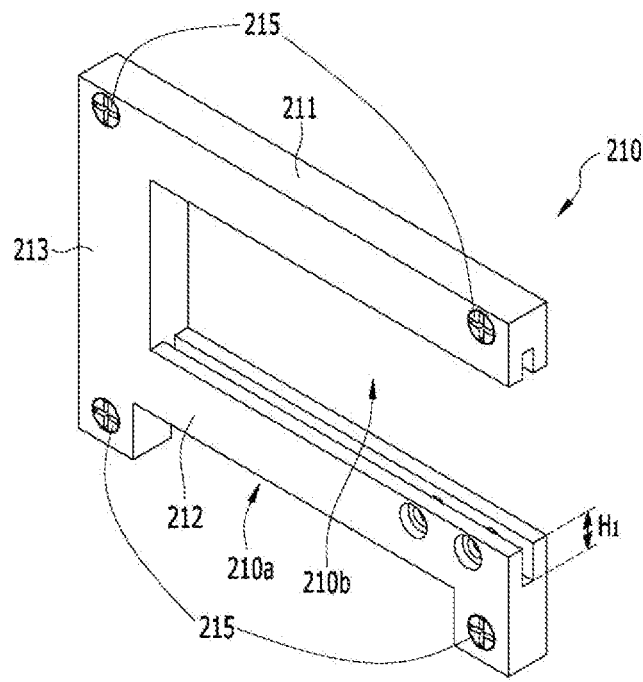
【FIG. 6】
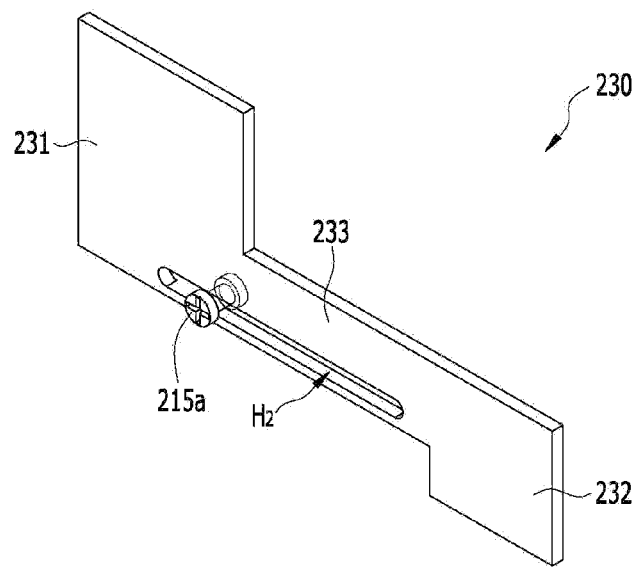

【FIG. 7A】
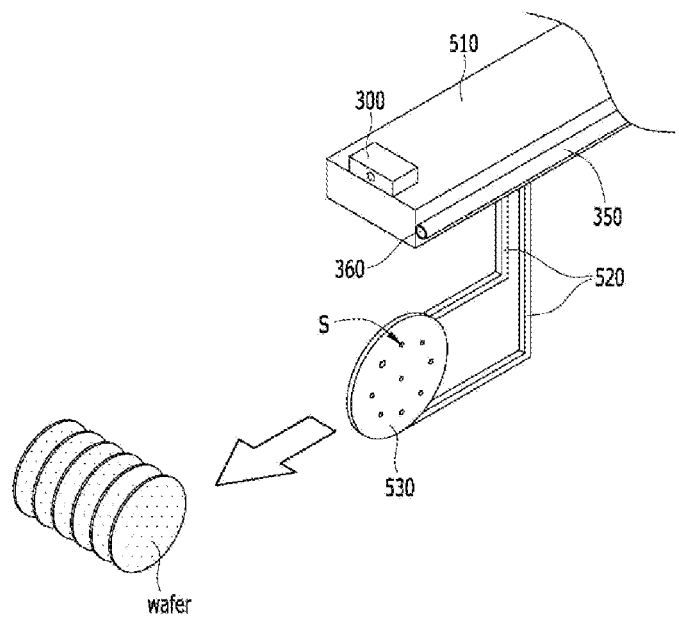
【FIG. 7B】
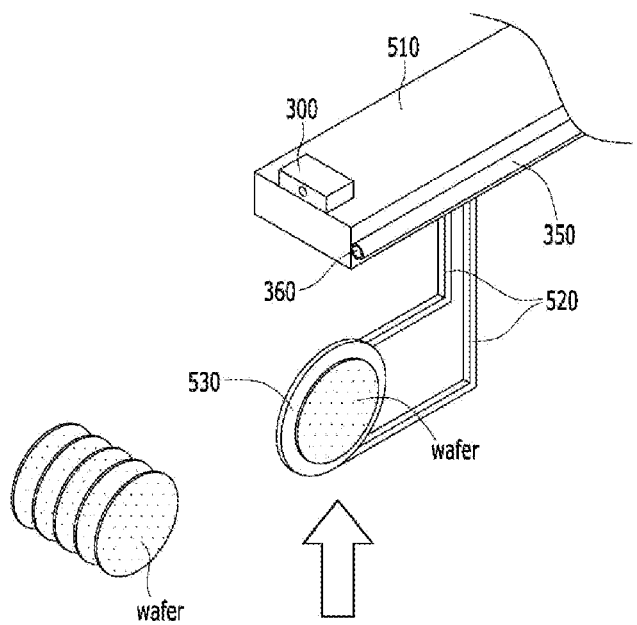

[FIG. 8]
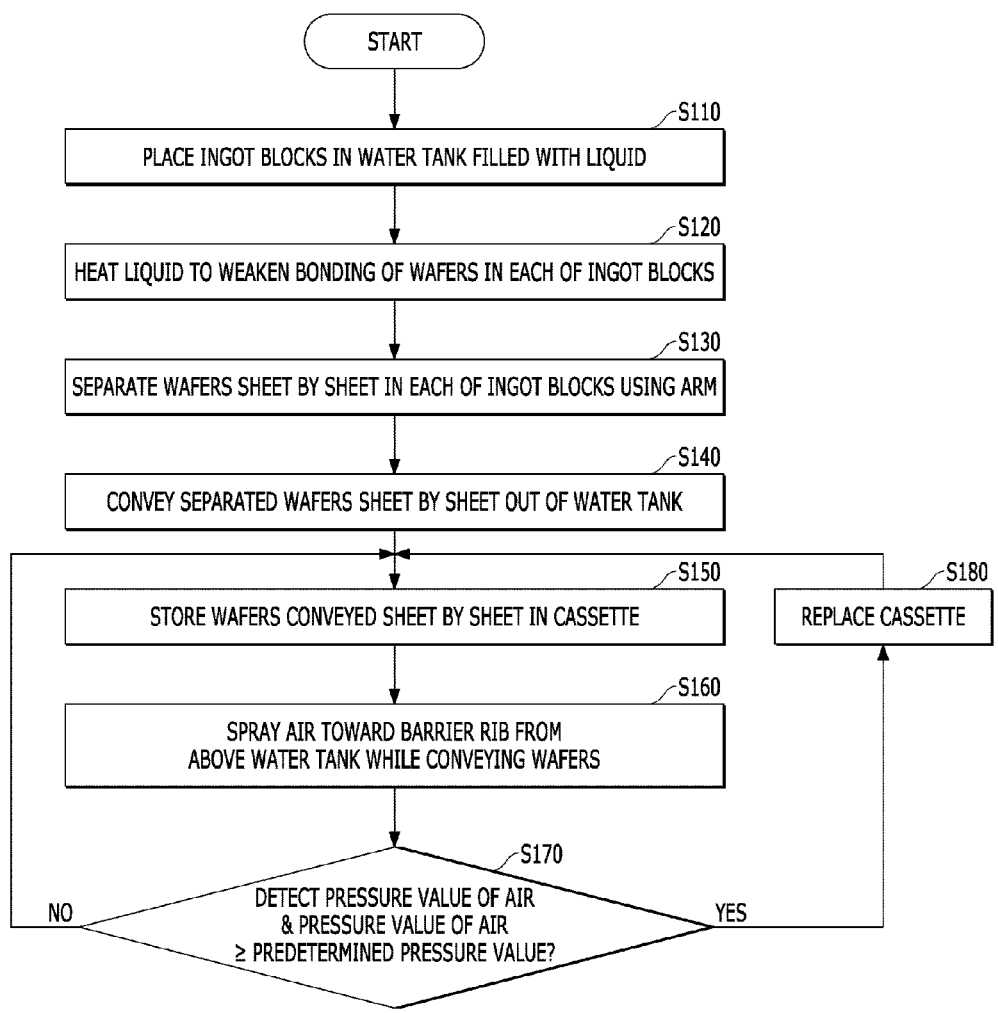

DEVICE AND METHOD FOR SEPARATING WAFERS

CROSS-REFERENCE TO RELATED PATENT APPLICATIONS

This application claims the benefit of Korean Patent Application No. 10-2023-0041220, filed on Mar. 29, 2023, which is hereby incorporated by reference as if fully set forth herein.

BACKGROUND OF THE INVENTION

Field of the Invention

The present disclosure relates to a wafer separation device and method for separating wafers sheet by sheet from an ingot block attached to a jig.

Discussion of the Related Art

Typically, a silicon wafer is manufactured using a method including a single-crystal growth process for producing a single crystal (ingot), a slicing process for slicing the ingot to obtain a thin disc-shaped wafer, a lapping process for removing damage remaining in the wafer due to mechanical processing performed in the slicing process, a polishing process for mirror-polishing the wafer, and a cleaning process for removing an abrasive or foreign substances adhered to the wafer while mirror-polishing the polished wafer.

A single-crystal silicon ingot is generally grown and manufactured through the Czochralski method. This method is a method in which polycrystalline silicon is melted in a crucible in a chamber, a seed crystal, which is a single crystal, is immersed in the silicon melt, and the seed crystal is slowly pulled up to grow a single-crystal silicon ingot having a desired diameter.

After the growth of the ingot is completed, a slicing process is performed to slice the ingot into a plurality of wafers.

The slicing process may be implemented in various manners. The representative slicing process is a wire sawing process in which a piano wire or a high-tension wire is reciprocated at high speed, a slurry solution is sprayed onto the wire, and the ingot is sliced by friction between the slurry attached to the wire and the ingot.

When the wire sawing process is performed, the ingot is attached to a jig using an adhesive in order to prevent the wafers sliced from the ingot from falling after the wire sawing process.

FIG. 1 is a view showing a wafer slicing process.

Referring to FIG. 1, an ingot 20 is attached to a jig 10 by means of an adhesive 30. As shown in the right part of FIG. 1, after the wire sawing process, wafers sliced sheet by sheet from the ingot 20 are attached to the jig 10 by means of the adhesive 30.

The structure shown in the right part of FIG. 1, in which the plurality of wafers is not completely separated, may be referred to as an ingot block.

After the cleaning process is completed, a process of separating the plurality of wafers sheet by sheet is performed on the ingot block.

In this case, the ingot block may be placed in a water tank, a liquid in which the ingot block is immersed may be heated in order to separate the wafers sheet by sheet from the jig, and the separated wafers may be delivered sheet by sheet to be loaded in a cassette by a robot arm.

However, the above-described process of separating the wafers sheet by sheet from the ingot block has the following problems.

Several ingot blocks, each of which has a length of about 20 to 50 millimeters, may be placed in one water tank. The shorter the length of the ingot block, the greater the number of ingot blocks placed in the water tank.

The properties of the ingot blocks may slightly differ from each other depending on the growth process. Therefore, it is preferable to store the ingot blocks in respectively different cassettes.

However, when several ingot blocks are placed in one water tank, it is difficult to distinguish between wafers separated sheet by sheet from one ingot block and wafers separated sheet by sheet from another adjacent ingot block, and thus wafers separated from different ingot blocks and having different properties may be stored together in one cassette.

SUMMARY OF THE INVENTION

Accordingly, the present disclosure is directed to a wafer separation device and method that substantially obviate one or more problems due to limitations and disadvantages of the related art.

An object of the present disclosure is to prevent wafers separated from different ingot blocks and having different properties from each other from being stored in the same cassette.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a device for separating wafers sheet by sheet from ingot blocks having a plurality of sliced wafers bonded thereto includes a water tank configured to receive the ingot blocks and a liquid, a heating member configured to heat the liquid, a barrier rib provided in the water tank to isolate the ingot blocks from each other, an arm configured to separate the wafers sheet by sheet from the ingot blocks, and a sensor configured to sense the barrier rib.

The barrier rib may include a body provided on an upper end portion of an edge of the water tank and an extension part extending from the body toward the central region of the water tank.

The barrier rib may further include a magnet provided on a lower portion of the body, and the water tank may include a metallic component to be coupled to the magnet through magnetic force.

The extension part may be moveable forward from the body toward the central region of the water tank and backward toward the body.

The body may include a lower plate, an upper plate formed so as to face the lower plate, and a column interconnecting an end portion of the lower plate and an end portion of the upper plate, and the magnet may be provided on a lower portion of the lower plate.

Each of the lower plate and the upper plate may include a first groove formed in an inner surface thereof, and the extension part may be inserted into the first groove and may slide forward and backward.

The extension part may include an extension body and a second groove formed in the extension body in a line shape in a horizontal direction.

The body of the barrier rib may include a sliding bar provided adjacent to an end portion of the lower plate formed opposite the column while passing through the second groove, and the extension part may slide in a state in which the sliding bar passing through the second groove is fixed to the lower plate.

Each of the ingot blocks may include a plurality of wafers.

The sensor may be fixed to an end portion of a support bar extending over the water tank and may move together with the support bar. The support bar may be provided with a spray part, and the spray part may be disposed adjacent to the sensor.

The spray part may receive air from a nozzle and may spray air toward the barrier rib, and the sensor may sense air returning back from the barrier rib.

The device may further include a controller configured to control operation of the support bar. When the pressure value of the air detected by the sensor becomes equal to or greater than a predetermined pressure value, the controller may stop conveyance of the wafers by the arm and may replace a cassette.

In another aspect of the present disclosure, a method of separating wafers sheet by sheet from ingot blocks having a plurality of sliced wafers bonded thereto includes placing the ingot blocks in a water tank filled with a liquid such that the ingot blocks are isolated from each other by a barrier rib provided in the water tank, heating the liquid to weaken bonding of the wafers in each of the ingot blocks, separating the wafers sheet by sheet in each of the ingot blocks using an arm, and conveying the separated wafers sheet by sheet out of the water tank.

The method may further include storing the wafers conveyed sheet by sheet in a cassette.

The method may further include spraying air toward the barrier rib from above the water tank.

The method may further include detecting the pressure value of air returning back after collision with the barrier rib and replacing the cassette storing the conveyed wafers when the detected pressure value of air is equal to or greater than a predetermined pressure value.

The wafers may be conveyed sheet by sheet from the water tank to the cassette by rotation of a plurality of rollers disposed between a pair of roller fixing frames.

The arm may be provided with a suction plate, and the wafers may be separated sheet by sheet from each of the ingot blocks by the suction plate suctioning air through suction holes formed therein to fix one of the wafers to the surface of the suction plate.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a view showing a wafer slicing process;

FIG. 2 is a view showing a device for separating wafers sheet by sheet;

FIG. 3 is a view showing a wafer separation device according to an embodiment of the present disclosure;

FIGS. 4A and 4B are views showing the barrier rib shown in FIG. 3;

FIGS. 5A and 5B are views showing a body of the barrier rib in detail;

FIG. 6 is a view showing an extension part of the barrier rib in detail;

FIGS. 7A and 7B are views showing a process in which an arm separates wafers sheet by sheet from an ingot block; and FIG. 8 is a flowchart showing a wafer separation method according to an embodiment of the present disclosure.

DETAILED DESCRIPTION OF THE INVENTION

The present disclosure will now be described more fully hereinafter with reference to the accompanying drawings, in which various embodiments are shown.

The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

FIG. 2 is a view showing a device for separating wafers sheet by sheet.

The wafer separation device according to the embodiment may include a water tank 100 configured to accommodate a liquid L and ingot blocks $IB_1$, $IB_2$, and $IB_3$, a heating member (not shown) configured to heat the liquid in the water tank, and an arm configured to separate wafers sheet by sheet from the ingot blocks. As will be described later, the wafer separation device according to the embodiment may include a barrier rib 200 provided in the water tank in order to isolate the ingot blocks from each other and a sensor 300 configured to sense the barrier rib 200.

Ingots grown in respectively different growth devices are sliced into a plurality of wafers $W_1$, $W_2$, and $W_3$ through, for example, a wire sawing process. In each ingot block $IB_1$, $IB_2$, or $IB_3$, the plurality of wafers $W_1$, $W_2$, or $W_3$ is adhered to a jig 10 by means of an adhesive 30.

In this case, because the ingot blocks $IB_1$, $IB_2$, and $IB_3$ are grown in respectively different growth devices, the properties thereof may be different from each other. Thus, the plurality of wafers $W_1$, $W_2$, and Ws may have different properties from each other.

When the liquid in the water tank is heated by the heating member, the adhesive strength of the adhesive 30 adhered to the jig 10 is weakened. At this time, the arm may separate a single wafer from the ingot block, and the separated wafer may be conveyed by an external conveying device 700.

As shown in FIG. 2, the conveying device 700 may include a pair of roller fixing frames 710 and a plurality of rollers 720 rotatably disposed between the pair of roller fixing frames 710. The wafer may be conveyed by rotation of the rollers 720.

The wafers may be stored in first to third cassettes $B_1$, $B_2$, and $B_3$. In this case, it is preferable to separately store wafers having different properties from each other. For example, the wafers $W_1$ separated from the ingot block $IB_1$ are stored in the first cassette $B_1$, the wafers $W_2$ separated from the ingot block $IB_2$ are stored in the second cassette $B_2$, and the wafers $W_3$ separated from the ingot block $IB_3$ are stored in the third cassette $B_3$.

In order to store the aforementioned wafers $W_1$, $W_2$, and $W_3$, which are respectively separated from the ingot blocks $IB_1$, $IB_2$, and $IB_3$, in the cassettes $B_1$, $B_2$, and $B_3$, respectively, the barrier rib and the sensor may operate as follows.

FIG. 3 is a view showing a wafer separation device according to an embodiment of the present disclosure. In FIG. 3, the interior of the water tank 100 and components disposed adjacent thereto are shown in detail. For convenience, the ingot blocks $IB_1$, $IB_2$, $IB_3$, and $IB_4$ are shown in small sizes.

The barrier rib 200 may be provided in plural, and the plurality of barrier ribs 200 may be disposed on an upper end portion of an edge of the water tank 100 so as to be spaced apart from each other at regular intervals. For example, when the ingot block has a length of 20 to 50 millimeters, the interval between the barrier ribs 200 may correspond thereto.

A separating body 500 to which the arm is fixed and the barrier ribs 200 may be disposed so as to face each other, with the water tank 100 interposed therebetween.

A support bar 510 extends from the separating body 500 to a region above the water tank 100. The sensor 300 may be provided on an end portion of the support bar 510, a nozzle 350 may extend from the separating body 500 along the support bar 510, and a spray part 360 may be provided at an end portion of the nozzle 350. Although not shown in the drawings, the arm 520 is provided at the support bar 510 to separate the wafers sheet by sheet from the ingot blocks. In detail, the arm 520 is provided with a suction plate 530 in order to separate the wafers sheet by sheet from the ingot blocks. This will be described later with reference to FIGS. 7A and 7B.

The nozzle 350 supplies air, and the spray part 360 sprays the air toward the barrier rib 200. When air is sprayed at a position adjacent to the barrier rib 200, the air collides with the barrier rib 200, and the sensor 300 detects a large amount of air reflected or scattered by the barrier rib 200. When the spray part 360 provided above the water tank 100 sprays air toward the water tank 100, the amount of air detected by the sensor 300 may be changed depending on whether the spray part 360 sprays air toward the barrier rib 200 or toward a region between the barrier ribs 200.

That is, when the spray part 360 is located above the barrier rib 200, a large amount of air collides with the barrier rib 200 and returns back, and thus the amount of air detected by the sensor 300 may increase. On the other hand, when the spray part 360 is located above a region between the barrier ribs 200, air is supplied to a region in the water tank between the barrier ribs 200, and thus the amount of air returning back to the sensor 300 may decrease. Using this operational principle, the sensor 300 may detect whether the barrier rib 200 is adjacent thereto.

In detail, a predetermined pressure value may be set in advance in the sensor 300. When air supplied from the spray part 360 collides with the barrier rib 200 and returns back, if the pressure value of the air detected by the sensor 300 is equal to or greater than the predetermined pressure value set in the sensor 300, the sensor 300 may detect that the barrier rib between the ingot blocks is adjacent thereto.

FIGS. 4A and 4B are views showing the barrier rib shown in FIG. 3, FIGS. 5A and 5B are views showing a body of the barrier rib in detail, and FIG. 6 is a view showing an extension part of the barrier rib in detail.

The barrier rib 200 may include a body 210 provided on an upper end portion of an edge of the water tank and an extension part 230 extending from the body 210 toward a central region of the water tank. A magnet 220 may be provided under the body 210. The water tank may include a metallic component so that the barrier rib 200 is coupled to the water tank by magnetic force between the magnet 220 and the water tank.

Referring to FIGS. 4A and 4B, the extension part 230 may move forward from the body 210 toward the central region of the water tank and backward toward the body 210 in a sliding manner. When the extension part moves forward toward the central region of the water tank, the extension part approaches the sensor and the spray part shown in FIG. 3, thereby reflecting or scattering air supplied from the spray part. When the process of separating the wafers sheet by sheet from the ingot blocks is completed, the extension part slides backward toward the body 210, and thus the overall volume of the barrier rib 200 may be reduced.

The body 210 may include a lower plate 212, an upper plate 211 formed so as to face the lower plate, and a column 213 interconnecting an end portion of the lower plate and an end portion of the upper plate. A groove 210*a* may be formed in the lower portion of the lower plate 212, and the magnet 220 may be disposed in the groove 210*a*. The extension part 230 may move to a central region 210*b* between the lower plate 212 and the upper plate 211.

Referring to FIG. 5B, a first groove $H_1$ may be formed in each of an inner surface of the lower plate 212 and an inner surface of the upper plate 211. The extension part may be inserted into the first groove $H_1$ and may slide forward and backward as described above.

Referring to FIGS. 4B and 6, the extension part 230 may include a second groove $H_2$ formed therein in a line shape in a horizontal direction.

Here, the horizontal direction may be a sliding direction of the extension part 230.

For example, the extension part 230 may include a first portion 231, a second portion 232, and a third portion 233, and the second groove $H_2$ may be formed in lower regions of the first portion 231 and the third portion 233. A lower end portion of the second portion 232 may extend to a position lower than lower end portions of the first and third portions 231 and 233. The second portion 232 may extend to the interior of the water tank to isolate adjacent ingot blocks from each other.

The body 210 may be provided with a plurality of fastening parts 215 to reinforce coupling between the front surface and the rear surface of the body 210. The fastening parts 215 may have a bolt shape, and the body 210 may include nut-shaped recesses formed therein to allow the fastening parts 215 to be coupled thereto.

The lower plate 212 of the body 210 is provided with a sliding bar 215*a*. The sliding bar 215*a* has a shape similar to that of the fastening part 215, but performs a different function from the fastening part 215. The sliding bar 215*a* may be provided adjacent to an end portion of the lower plate 212 formed opposite the column 213.

Referring to FIGS. 4A, 4B, and 6, the sliding bar 215*a* may be inserted into the lower plate 212 of the body 210 while passing through the second groove H₂ formed in the extension part 230. Both end portions of the sliding bar 215a passing through the second groove H₂ may be fixedly fastened to two opposite surfaces of the lower plate 212. In this way, in the state in which the sliding bar 215a passing through the second groove H₂ is fixed, the extension part 230 slides forward and backward, and the sliding bar 215a prevents the extension part 230 from being separated from the body 210.

In the above-described wafer separation device according to the present disclosure, ingot blocks, each of which includes a plurality of wafers having a different property from the wafers of the other ingot blocks, may be inserted into the water tank, and the adhesive strength of the adhesive for attaching the wafers to the jig in each ingot block may be weakened when the liquid in the water tank is heated.

At this time, the extension part of the barrier rib may slide to the interior of the water tank to isolate the ingot blocks from each other. Thereafter, while the arm separates the wafers sheet by sheet and conveys the separated wafers to the outside, the spray part adjacent to the arm may spray air toward the water tank, and the sensor may detect the amount of air returning back after collision with the barrier rib or the extension part. When the amount of air detected increases, it may be determined that the barrier rib is adjacent to the arm and that an ingot block having another property is present. Thereafter, the wafers separated sheet by sheet from the ingot block having the other property may be conveyed to another cassette.

FIGS. 7A and 7B are views showing a process in which the arm separates wafers sheet by sheet from the ingot block.

The arm 520 connected to the lower portion of the support bar 510 shown in FIG. 3 is provided with a suction plate 530, and the suction plate 530 includes a plurality of suction holes s formed therein. Although not shown in the drawings, an exhaust line is provided in the arm 520 or adjacent to the arm 520 to suction air from the suction holes s in the suction plate 530, thereby fixing wafers to the surface of the suction plate.

When the wafers are separated from the jig by the heated liquid in the water tank, the arm 520 may approach the wafers, as shown in FIG. 7A. When one wafer is attached to the surface of the suction plate 530, the arm 520 may ascend to convey the one wafer to the conveying device. When the pressure value of the air detected by the sensor becomes equal to or greater than the predetermined pressure value, the controller (not shown) may stop conveyance of the wafer by the arm, and may replace a cassette.

Hereinafter, a wafer separation method according to an embodiment of the present disclosure will be described with reference to FIG. 8. Here, the wafer separation method is a method of separating wafers sheet by sheet from the ingot blocks to which a plurality of sliced wafers are bonded using the device shown in FIGS. 2 to 7B.

First, ingot blocks $IB_1$ to $IB_4$ may be placed in the water tank 100 filled with the liquid L (S110). In this case, the barrier ribs 200 are provided in the water tank 100 to isolate adjacent ingot blocks from each other.

Thereafter, the liquid L may be heated to weaken bonding of the plurality of wafers in each of the ingot blocks (S120).

Thereafter, the wafers may be separated sheet by sheet in each of the ingot blocks using the arm (S130), and the separated wafers may be conveyed sheet by sheet out of the water tank (S140).

In the above-described step S130 of separating the wafers sheet by sheet, as shown in FIGS. 7A and 7B, the suction plate 530 provided at the arm 520 (refer to FIG. 3) suctions air through the suction holes s to fix the wafer to the surface of the suction plate. In this way, the wafers may be separated sheet by sheet from each of the ingot blocks.

Thereafter, the wafers conveyed sheet by sheet may be stored in the cassette (S150). For example, the wafers discharged sheet by sheet out of the water tank 100 may be conveyed sheet by sheet to the cassette from the water tank 100 by rotation of the plurality of rollers 720 disposed between the pair of roller fixing frames 710 (refer to FIG. 2).

Thereafter, while the wafers are conveyed, air is sprayed toward the barrier rib from above the water tank (S160), and the pressure value of the air returning back after collision with the barrier rib is detected. When air is sprayed at a position adjacent to the barrier rib 200, a large amount of air may collide with the barrier rib and may return back by being reflected or scattered by the barrier rib, and thus the amount of air detected by the sensor 300 may increase. The pressure value of the air is detected by the sensor (S170). When the detected pressure value of the air is equal to or greater than the predetermined pressure value (YES in S170), the cassette storing the conveyed wafers may be replaced (S180). When the detected pressure value of the air is less than the predetermined pressure value (NO in S170), the conveyed wafers may be stored in the cassette without replacement of the cassette (S150).

According to the above-described wafer separation method, when a plurality of ingot blocks having small volumes is placed in one water tank and wafers are separated sheet by sheet from the ingot blocks, the wafers that are separated from each of the ingot blocks and have a different property from the wafers of the other ingot blocks may be stored in a respective one of the cassettes.

As is apparent from the above description, according to the wafer separation device of the present disclosure, the extension part of the barrier rib slides and extends to the interior of the water tank to isolate ingot blocks from each other, the spray part provided adjacent to the arm sprays air toward the water tank, and the sensor detects the amount of air returning back after collision with the barrier rib. Based thereon, wafers that are separated sheet by sheet from each of the ingot blocks and have a different property from wafers of the other ingot blocks are conveyed to a respective one of cassettes. Accordingly, it is possible to prevent wafers having different properties from each other from being stored together in one cassette.

Even though the embodiments of the present disclosure have been described in more detail with reference to the accompanying drawings, the present disclosure is not necessarily limited to these embodiments, and may be variously modified and implemented without departing from the technical spirit of the present disclosure. Therefore, the embodiments disclosed herein are not intended to limit the technical spirit of the present disclosure, but to describe the technical spirit, and the scope of the technical spirit of the present disclosure is not limited by these embodiments. Accordingly, it should be understood that the embodiments described above are illustrative in all respects and not restrictive. The protection scope of the present disclosure should be construed according to the scope of the claims, and all technical ideas within the scope equivalent thereto should be construed as being included in the scope of the present disclosure.

What is claimed is:

1. A device for separating wafers sheet by sheet from ingot blocks having a plurality of sliced wafers bonded thereto, the device comprising:
   a water tank configured to receive the ingot blocks and a liquid;

a heating member configured to heat the liquid;

a barrier rib provided in the water tank to isolate the ingot blocks from each other;

an arm configured to separate the wafers sheet by sheet from the ingot blocks; and a sensor configured to sense the barrier rib, wherein the sensor is fixed to an end portion of a support bar extending over the water tank and moves together with the support bar, and wherein the support bar is provided with a spray part, and the spray part is disposed adjacent to the sensor.

2. The device according to claim 1, wherein the barrier rib comprises:

a body provided on an upper end portion of an edge of the water tank; and an extension part extending from the body toward a central region of the water tank.

3. The device according to claim 2, wherein the barrier rib further comprises a magnet provided on a lower portion of the body, and wherein the water tank comprises a metallic component to be coupled to the magnet through magnetic force.

4. The device according to claim 3, wherein the extension part is moveable forward from the body toward the central region of the water tank and backward toward the body.

5. The device according to claim 4, wherein the body comprises a lower plate, an upper plate formed so as to face the lower plate, and a column interconnecting an end portion of the lower plate and an end portion of the upper plate, and wherein the magnet is provided on a lower portion of the lower plate.

6. The device according to claim 5, wherein each of the lower plate and the upper plate comprises a first groove formed in an inner surface thereof, and wherein the extension part is inserted into the first grooves of the lower and upper plates and slides forward and backward.

7. The device according to claim 6, wherein the extension part comprises an extension body and a second groove formed in the extension body in a line shape in a horizontal direction.

8. The device according to claim 7, wherein the body of the barrier rib comprises a sliding bar provided adjacent to an end portion of the lower plate formed opposite the column while passing through the second groove, and wherein the extension part slides in a state in which the sliding bar passing through the second groove is fixed to the lower plate.

9. The device according to claim 1, wherein each of the ingot blocks comprises a plurality of wafers.

10. The device according to claim 1, wherein the spray part receives air from a nozzle and sprays air toward the barrier rib, and wherein the sensor senses air returning back from the barrier rib.

11. The device according to claim 10, further comprising a controller configured to control operation of the support bar, wherein, when a pressure value of the air detected by the sensor becomes equal to or greater than a predetermined pressure value, the controller stops conveyance of the wafers by the arm and replaces a cassette.

12. A device for separating wafers sheet by sheet from ingot blocks having a plurality of sliced wafers bonded thereto, the device comprising:

a water tank configured to receive the ingot blocks and a liquid;

a heating member configured to heat the liquid;

a barrier rib provided in the water tank to isolate the ingot blocks from each other;

an arm configured to separate the wafers sheet by sheet from the ingot blocks; and a sensor configured to sense the barrier rib, wherein the barrier rib comprises:

a body provided on an upper end portion of an edge of the water tank; and an extension part extending from the body toward a central region of the water tank, wherein the barrier rib further comprises a magnet provided on a lower portion of the body, wherein the water tank comprises a metallic component to be coupled to the magnet through magnetic force, and wherein the extension part is moveable forward from the body toward the central region of the water tank and backward toward the body.

13. The device according to claim 12, wherein the body comprises a lower plate, an upper plate formed so as to face the lower plate, and a column interconnecting an end portion of the lower plate and an end portion of the upper plate, and wherein the magnet is provided on a lower portion of the lower plate.

14. The device according to claim 13, wherein each of the lower plate and the upper plate comprises a first groove formed in an inner surface thereof, and wherein the extension part is inserted into the first grooves of the lower and upper plates and slides forward and backward.

15. The device according to claim 14, wherein the extension part comprises an extension body and a second groove formed in the extension body in a line shape in a horizontal direction.

16. The device according to claim 15, wherein the body of the barrier rib comprises a sliding bar provided adjacent to an end portion of the lower plate formed opposite the column while passing through the second groove, and wherein the extension part slides in a state in which the sliding bar passing through the second groove is fixed to the lower plate.

17. The device according to claim 12, wherein each of the ingot blocks comprises a plurality of wafers.

* * * * *